No. 616,143. Patented Dec. 20, 1898.
J. F. ROSE.
SALT CELLAR.
(Application filed July 8, 1898.)
(No Model.)
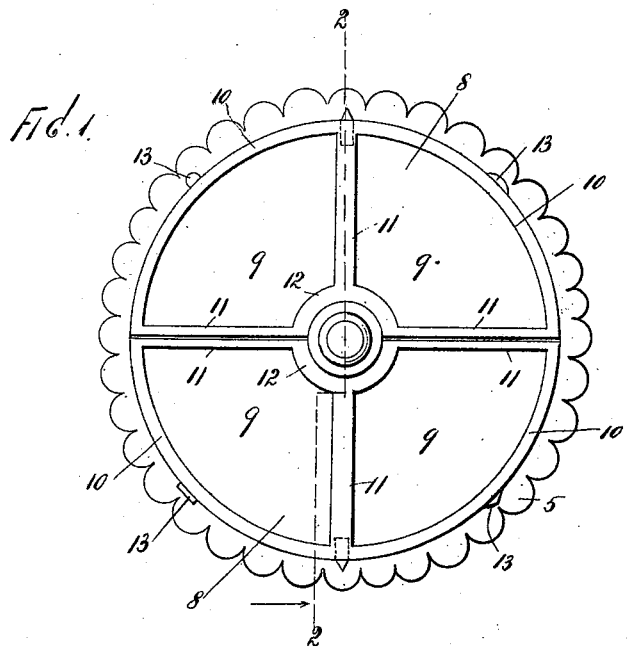
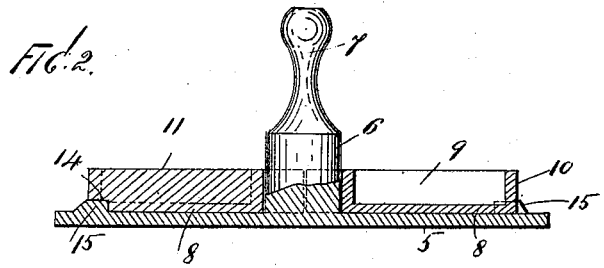
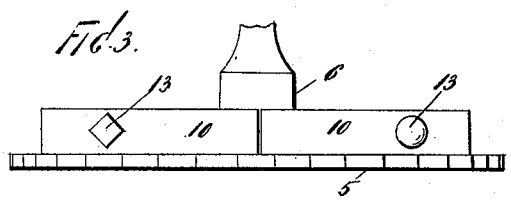
WITNESSES
John Buckler,
F. A. Stewart
INVENTOR
Joseph F. Rose,
BY
Edgar Tate & Co
ATTORNEYS

UNITED STATES PATENT OFFICE.

JOSEPH F. ROSE, OF TIVERTON, RHODE ISLAND.

SALT-CELLAR.

SPECIFICATION forming part of Letters Patent No. 616,143, dated December 20, 1898.

Application filed July 8, 1898. Serial No. 685,416. (No model.)

*To all whom it may concern:*

Be it known that I, JOSEPH F. ROSE, a citizen of the United States, residing at Tiverton, in the county of Newport and State of Rhode Island, have invented certain new and useful Improvements in Salt-Cellars, of which the following is a full and complete specification, such as will enable those skilled in the art to which it appertains to make and use the same.

This invention relates to salt cellars or receivers and supports therefor; and the object thereof is to provide an improved device of this class which comprises a circular base or frame which is provided with a plurality of detachable salt-receivers which are nested together in the form of a circle and the outer wall of each of which is provided with a character or device by which each of the salt-receivers is designated.

The invention is fully disclosed in the following specification, of which the accompanying drawings form a part, in which—

Figure 1 is a plan view of my improvement; Fig. 2, a section thereof on the line 2 2, and Fig. 3 a side view.

In the drawings forming part of this specification the separate parts of my improvement are designated by the same numerals of reference in each of the views, and in the practice of my invention I provide a frame or holder comprising a circular base 5, the perimeter of which is preferably provided with corrugations or scallops, whereby the same is ornamented, and the base 5 is provided centrally with an upwardly-directed cylindrical standard 6, which is provided with a handle 7.

The standard 6 is preferably formed integrally with a base 5, and mounted on said base are two semicircular detachable casings 8, each of which is provided with two receptacles 9, and the outer wall of each of these receptacles 9 is segmental in form, as shown at 10, and two of the walls thereof are radial in form, as shown at 11, and the inner walls are segmental in form, as shown at 12, and said inner walls inclose the standard 6.

The outer segmental walls 10 of each of the receptacles 9 is provided with a designating character, which consists of a projection 13, formed thereon, and these projections may be circular, square, triangular, or diamond shaped in form, and two of said projections are shown in Fig. 3, the only object in this construction being to provide the outer wall of each of said receptacles 9 with a designating character or projection which will distinguish the same from each of the other receptacles.

Each of the separate receptacles 9 serves as an individual salt receiver or cellar, and it will be apparent that instead of employing two of the casings 8, each of which is provided with two separate receptacles, each separate receptacle may constitute a separate casing, in which event four of said casings will be employed.

Each of the casings 8 is provided in the perimeter thereof with an angular cavity or recess 14, and the base 5 is provided with corresponding angular lugs or projections 15, which enter said cavities or recesses, and by means of this construction the casings 8 in which the receptacles 9 are formed are held in position and the lateral movement thereof prevented.

My improved salt-cellar is particularly adapted for use by families, and one of the objects thereof is to provide an improved device of this class by which each member of the family may have a separate salt cellar or receiver, all of said salt cellars or receivers being nested together and compact in form and supported or carried by a single frame or post provided with a handle.

It will be apparent that any desired number of the receivers or receptacles 9 may be employed, and changes in and modifications of the construction herein described may be made without departing from the spirit of my invention or sacrificing its advantages.

Having fully described my invention, I claim as new and desire to secure by Letters Patent—

1. A device of the character herein described, comprising a circular base having a central vertical cylindrical standard, and a plurality of detachable casings or receptacles grouped around said standard and resting upon said base, the outer walls of said casings or receptacles being segmental in form, and the side walls thereof radial in form, whereby the said casings or receptacles when grouped together form a complete circle, and the outer segmental walls of each of said casings or receptacles being provided with an angular recess and said base being provided at its periphery with an upwardly-extending annular retaining-lug fitting said angular recess, and the outer segmental walls of each of said casings or receptacles extending above said annular retaining-lug and being provided with a designating character or projection, substantially as shown and described.

2. A device of the character herein described, comprising a circular base having a central vertical cylindrical standard, and a plurality of detachable casings or receptacles grouped around said standard, and resting upon said base, the outer walls of said casings or receptacles being segmental in form, and the side walls thereof radial in form, whereby the said casings or receptacles when grouped together form a complete circle, and the outer segmental walls of each of said casings or receptacles being provided with an angular recess and said base being provided at its periphery with an upwardly-extending annular retaining-lug fitting said angular recess, the outer segmental walls of each of said casings or receptacles extending above said annular retaining-lug, and being provided with a designating character or projection, said standard extending above said casings and terminating in a handle, substantially as shown and described.

In testimony that I claim the foregoing as my invention I have signed my name, in presence of the subscribing witnesses, this 6th day of July, 1898.

JOSEPH F. ROSE.

Witnesses:
 ABBY B. HAMBLY,
 ESTHER B. BROWNELL.